(12) United States Patent
Tsukida et al.

(10) Patent No.: US 7,678,436 B2
(45) Date of Patent: Mar. 16, 2010

(54) PRESSURE SENSITIVE ADHESIVE FILM OVERLAMINATION

(75) Inventors: Tatsuya Tsukida, Saitama (JP); Makoto Inoue, Saitama (JP)

(73) Assignee: Lintec Corporation, Tokyo (JP)

( * ) Notice: Subject to any disclaimer, the term of this patent is extended or adjusted under 35 U.S.C. 154(b) by 44 days.

(21) Appl. No.: 10/498,499

(22) PCT Filed: Sep. 25, 2003

(86) PCT No.: PCT/JP03/12241

§ 371 (c)(1),
(2), (4) Date: Jun. 14, 2004

(87) PCT Pub. No.: WO2004/031312

PCT Pub. Date: Apr. 15, 2004

(65) Prior Publication Data

US 2005/0064125 A1  Mar. 24, 2005

(30) Foreign Application Priority Data

Oct. 4, 2002  (JP) .............................. 2002-291942

(51) Int. Cl.
*B32B 9/00* (2006.01)
*B32B 33/00* (2006.01)
*B32B 37/00* (2006.01)
*B32B 7/12* (2006.01)

(52) U.S. Cl. .................... 428/40.1; 428/40.2; 428/41.3; 428/41.4; 428/41.5; 428/354; 158/60

(58) Field of Classification Search ................ 428/40.1, 428/40.2, 41.3, 41.4, 41.8, 323, 355 R, 447, 428/448
See application file for complete search history.

(56) References Cited

U.S. PATENT DOCUMENTS 3,342,766 A * 9/1967 Huntington ................. 524/730
5,234,736 A * 8/1993 Lee ............................ 428/41.5
6,071,987 A * 6/2000 Matsumoto et al. ......... 523/209
6,270,871 B1 * 8/2001 Scholz et al. ............... 428/40.1
6,541,566 B1 * 4/2003 Farwaha et al. ............. 524/837
2002/0081426 A1 * 6/2002 Inokuchi et al. ............. 428/343

FOREIGN PATENT DOCUMENTS

| EP | 1 460 116 A1 | | 9/2004 |
| JP | 63008307 A | * | 1/1988 |
| JP | 03169540 | * | 7/1991 |
| JP | 08309943 A | * | 11/1996 |
| JP | 08084495 | * | 9/1997 |
| JP | 10-44292 | | 2/1998 |
| JP | 2001-187872 | | 7/2001 |
| JP | 2002-249739 | | 9/2002 |

OTHER PUBLICATIONS

Patent Abstracts of Japan, JP 2001-240819, Sep. 4, 2001.

* cited by examiner

*Primary Examiner*—Patricia L Nordmeyer
(74) *Attorney, Agent, or Firm*—Oblon, Spivak, McClelland, Maier & Neustadt, L.L.P.

(57) ABSTRACT

There is disclosed an overlaminating adhesive film comprising a transparent film, an adhesive layer and a release material successively laminated in this order, wherein said release material has a surface contacting with the adhesive layer, said surface having a centerline average surface roughness of 0.5 µm or lower; an adhesive forming said adhesive layer has a pH of 7.2 to 8.5 in a solution state before applied, and is an acrylic emulsion-type adhesive having an average particle size of 200 nm or smaller; and a monomer component used for production of said adhesive includes an alkoxysilane group-containing unsaturated monomer in which each alkoxy group has 1 to 4 carbon atoms, but includes no hydroxy-containing unsaturated monomer. The overlaminating adhesive film of the present invention exhibits a good water resistance and is free from deterioration in its transparency due to lifting or bubbles when laminated on an adherend.

11 Claims, No Drawings

PRESSURE SENSITIVE ADHESIVE FILM OVERLAMINATION

TECHNICAL FIELD

The present invention relates to an overlaminating adhesive film, and more particularly to an overlaminating adhesive film having a good water resistance and being free from deterioration in its transparency due to lifting and bubbles when laminated over an adherend, which is capable of preventing an ink-jet printed surface over which the film was laminated, from suffering from ink bleeding even when the printed surface is allowed to stand under humidified conditions.

BACKGROUND ARTS

Overlaminating adhesive films have been used to protect a printed surface produced by thermal transfer printing, ink-jet printing, offset-printing, letterpress printing, gravure printing, etc., from damages by water, sunlight, scratches, etc. The overlaminating adhesive films generally comprise a surface base material in the form of a transparent film, a release material and an adhesive layer sandwiched therebetween. The release material is peeled off from the films upon use.

The adhesives used in the overlaminating adhesive films include various adhesives of an emulsion type, a solvent type, a solvent-free type, etc. which are made of rubber-based, acrylic or vinyl ether-based compounds. Among these adhesives, the acrylic adhesives are more suitably used because the adhesives of this type are excellent in weather resistance, peeling stability with time and transparency. In particular, special attention has been recently paid to emulsified acrylic adhesives since the adhesives contain no organic solvent harmful to human bodies and, therefore, are favorable to environments (for example, refer to Japanese Patent Application Laid-open Nos. 2001-240819 and 2002-80809).

However, in general, the emulsion-type adhesives are considerably deteriorated in water whitening resistance and water adhesion resistance as compared to those of the solvent type adhesives. Also, when the above acrylic emulsion-type adhesive is used to produce an overlaminating adhesive film by a so-called transfer-coating method in which the adhesive is applied on a release material and then a transparent film is laminated over the adhesive, it is required that an additive for improving the wettability such as surfactant is added to the adhesive in order to enhance a wettability of the adhesive to the release material. The addition of the additive, however, causes deterioration in water resistance of the resultant adhesive film. In particular, in the case where the overlaminating adhesive film is laminated over an ink-jet printed surface, there arises such a problem that the printed surface suffers from ink bleeding when preserved under humidified conditions.

DISCLOSURE OF THE INVENTION

In view of the above problems, an object of the present invention is to provide an overlaminating adhesive film having a high water resistance which is capable of preventing an ink-jet printed surface over which the adhesive film is laminated, from suffering from ink bleeding even when the printed surface is preserved under humidified conditions, notwithstanding the adhesive film is produced by any of a direct coating method of directly applying an acrylic emulsion-type adhesive on a transparent film and then laminating a release material on the adhesive, and the above transfer coating method.

As a result of extensive researches for achieving the above object, the present inventors have found that the above problems have been overcome by the following specific overlaminating adhesive film:

(1) An overlaminating adhesive film comprising a transparent film, an adhesive layer and a release material successively laminated in this order, wherein said release material has a surface contacting with the adhesive layer, said surface having a centerline average surface roughness of 0.5 µm or lower; an adhesive forming said adhesive layer has a pH of 7.2 to 8.5 in a solution state before applied; and is an acrylic emulsion-type adhesive having am average particle size of 200 nm or smaller; and a monomer component used for production of said adhesive includes an alkoxysilane group-containing unsaturated monomer in which each alkoxy group has 1 to 4 carbon atoms, but includes no hydroxy-containing unsaturated monomer;

(2) the overlaminating adhesive film according to the above aspect (1), wherein said acrylic emulsion-type adhesive is prepared by emulsion-polymerizing a mixture composed mainly of an acrylic acid ester containing a $C_4$ to $C_{12}$ alkyl group and a carboxyl-containing unsaturated monomer;

(3) the overlaminating adhesive film according to the above aspect (1) or (2), wherein said acrylic emulsion-type adhesive is directly applied on the transparent film, and then the release material is laminated over the adhesive; and (4) the overlaminating adhesive film according to the above aspect (1) or (2), wherein said acrylic emulsion-type adhesive is applied on the release material, and then the transparent film is laminated over the adhesive.

The present invention has been accomplished on the basis of this finding.

PREFERRED EMBODIMENT TO CARRY OUT THE INVENTION

The transparent film used in the present invention is not particularly restricted as long as the film exhibits a transparency sufficient to recognize information present on an adherend. Examples of the transparent film include polyolefin films such as polyethylene film and polypropylene film, polyester films such as polyethylene terephthalate (PET) film and polyethylene naphthalate film, polystyrene films or the like. Usually, the above transparent films are preferably used in the form of a biaxially oriented film, and may be appropriately selected according to applications thereof. The thickness of the transparent film may also be appropriately selected according to applications or conditions thereof, and is preferably in the range of 10 to 100 µm and more preferably 15 to 50 µm.

One or both surfaces of the transparent film are preferably subjected to corona treatment and/or anchor treatment. These treatments are effective to enhance the adhesion of the transparent film to the adhesive layer as well as the coatability thereon. However, if these treatments are excessively conducted, the resultant adhesive film tends to be deteriorated in transparency. Therefore, these treatments are preferably carried out to such an extent as not to adversely affect the transparency of the adhesive film.

The release material used in the present invention must satisfy such a requirement that its surface contacting with the adhesive layer has a centerline average surface roughness of 0.5 µm or lower. When the release material such as release paper has a low surface smoothness, irregularities present on its surface are directly transferred to the adhesive layer. For this reason, if the centerline average surface roughness of the release material exceeds 0.5 μm, there tend to occur defects such as poor transparency and deteriorated adhesion strength of the resultant adhesive film. From these viewpoints, the centerline average surface roughness of the release material is more preferably 0.2 μm or lower.

Meanwhile, the above centerline average surface roughness is measured by fixing the release material on a slide glass such that its surface contacting with the adhesive layer faces upwards, using a surface analyzer "SAS-2010 Model" available from Meishin Koki Co., Ltd., according to JIS B 0601-1982.

The materials of the release material used in the present invention are not particularly restricted as long as they can satisfy the above requirements. However, it is required that surface layers of the release material and the adhesive layer are readily peeled from each other at an interface therebetween. Therefore, the release material may be suitably selected from those materials produced by laminating a resin film made of polyethylene, etc., on a kraft paper, a glassine paper, a wood-free paper, a cast-coated paper, a clay-coated paper, etc.; those materials produced by coating a water-soluble polymer such as polyvinyl alcohol and starch on a kraft paper, a wood-free paper, a cast-coated paper, etc., those materials produced by applying a silicone-based release agent, etc., onto a film or a synthetic paper made of polyolefins or polyesters; and the like.

Of these release materials, in view of a less burden to environments, especially preferred are such release papers obtained by applying a solvent-free silicone as a release agent thereonto.

The acrylic emulsion-type adhesive constituting the adhesive layer of the present invention is required to exhibit a pH of 7.2 to 8.5 in a solution state before applied. When the pH of the adhesive is less than 7.2, particles emulsified in the adhesive is deteriorated in stability and, therefore, tends to be agglomerated. The agglomeration of the particles tends to cause deterioration in mechanical stability of the adhesive upon coating, which results in formation of streaks due to poor coatability thereof as well as poor film-forming ability and low water resistance of the dried coating film.

On the other hand, when the pH of the adhesive exceeds 8.5, alkali such as aqueous ammonia which is added for controlling the pH tends to be inhibited from vaporizing upon drying, so that the obtained adhesive film is deteriorated in water resistance.

The pH of the adhesive is preferably controlled to the above specified range by adding weak alkali thereto, more preferably by adjusting the pH using aqueous ammonia from the viewpoint of simplicity. Meanwhile, when the aqueous ammonia is used as alkali and added to the adhesive in such a large amount that the pH thereof exceeds 8.5, the obtained adhesive film tends to release undesired ammonia odor due to residual ammonia.

Also, the acrylic emulsion-type adhesive of the present invention is required to have an average particle size of 200 nm or smaller in a solution state before applied. When the average particle size of the acrylic emulsion-type adhesive exceeds 200 nm, the obtained adhesive layer tends to be deteriorated in water resistance. The average particle size of the acrylic emulsion-type adhesive may be controlled by previously incorporating a surfactant into the reaction system. As the amount of the surfactant added to the reaction system increases, the average particle size of the acrylic emulsion-type adhesive can be reduced. Usually, an optimum amount of the surfactant added may be appropriately selected according to kind thereof.

Meanwhile, in the present invention, the average particle size of the acrylic emulsion-type adhesive was measured as follows. Namely, a dilute dispersion prepared by diluting the acrylic emulsion-type adhesive into a concentration of 100 ppm with water, is measured by a light scattering method using "NICOMP Model 370" available from Particle Sizing Systems, Inc.

The monomer component used for producing the acrylic emulsion-type adhesive of the present invention is required to contain an alkoxysilane group-containing unsaturated monomer. When such a monomer is contained in the monomer component, the obtained adhesive is enhanced in cohesive force after coating, and irregularities present on the surface of the release material are hardly transferred to the adhesive. As a result, there can be attained such an effect that the obtained adhesive film is inhibited from being deteriorated in transparency.

The alkoxysilane group-containing unsaturated monomer used in the present invention is such an unsaturated monomer to which an alkoxysilane group is bonded. Examples of the alkoxysilane group include a monoalkoxysilane group, a dialkoxysilane group and a trialkoxysilane group. Each alkoxy group contained in the alkoxysilane groups preferably has 1 to 4 carbon atoms, more preferably 1 or 2 carbon atoms. When a plurality of alkoxy groups are present in one alkoxysilane group, the numbers of carbon atoms contained in the respective alkoxy groups may be the same or different from each other. The elements other than alkoxy in the alkoxysilane group may be a hydrogen atom or an alkyl substituent group.

An unsaturated portion of the alkoxysilane group-containing unsaturated monomer, namely a portion forming a main chain of the resultant polymer is not limited to particular ones as long as it has a good polymerization activity. As the unsaturated portion, there may be preferably used those having an alkylene skeleton such as ethylene skeleton (vinyl skeleton), propylene skeleton and butylene skeleton, and more preferably those having such an alkylene skeleton whose hydrogen atoms are partially substituted with a (meth)acryloxy group.

Specific examples of the alkoxysilane group-containing unsaturated monomer include vinylmethoxysilane, vinylethoxysilane, vinyltris(β-methoxyethoxy)silane, γ-methacryloxypropyltrimethoxysilane, γ-methacryloxypropyldimethoxysilane, γ-methacryloxypropyltriethoxysilane, γ-methacryloxypropyldiethoxysilane, γ-acryloxypropyltrimethoxysilane, γ-acrylox γ-propyldimethoxysilane, γ-acryloxypropyltriethoxysilane, γ-acryloxypropyldieth oxysilane or the like. Of these monomers, especially preferred are γ-methacryloxypropyltrimethoxysilane and γ-methacryloxypropyltriethoxysilane. These monomers may be used singly or in the form of a mixture of any two or more thereof.

The alkoxysilane group-containing unsaturated monomer may be added in an amount of 0.001 to 5 parts by mass based on 100 parts by mass of whole monomers used for producing the acrylic emulsion-type adhesive. When the alkoxysilane group-containing unsaturated monomer is used in the above-specified range, the effect mentioned above can be remarkably exhibited. Further, in view of the aimed effect, the amount of the alkoxysilane group-containing unsaturated monomer added is more preferably 0.1 to 1 part by mass.

Also, it is required that the monomer component used for producing the acrylic emulsion-type adhesive contains no unsaturated monomer containing a hydroxyl group. If an adhesive prepared from the monomer component including the hydroxy-containing unsaturated monomer is used to produce an overlaminating adhesive film, the ink-jet printed surface on which the overlaminating adhesive film is laminated tends to suffer from ink bleeding when the printed surface is allowed to stand under humidified conditions. It is considered that the undesirable ink bleeding under humidified conditions is caused by the interaction between the hydroxyl group, an ink-receiving layer of the ink-jet printed surface and the ink, though not clearly known.

On the other hand, when the overlaminating adhesive film using no hydroxy-containing unsaturated monomer according to the present invention is laminated over the ink-jet printed surface, the printed surface is substantially free from ink bleeding even under humidified conditions.

The acrylic emulsion-type adhesive used in the present invention is not particularly restricted as long as it satisfies the above requirements. For example, there may be used acrylic emulsion-type adhesives produced by emulsion-polymerizing a mixture composed mainly of (a) an acrylic acid ester containing a $C_4$ to $C_{12}$ alkyl group and (b) a carboxyl-containing unsaturated monomer in the presence of a polymerization initiator, a chain transfer agent, an emulsifier, a dispersant, etc., by a known method.

Specific examples of the acrylic acid ester (a) containing a $C_4$ to $C_{12}$ alkyl group include n-butyl acrylate, isobutyl acrylate, 2-ethylhexyl acrylate, n-octyl acrylate, isooctyl acrylate, n-nonyl acrylate, isononyl acrylate, lauryl acrylate or the like. These acrylic acid esters (a) may be used singly or in the from of a mixture of any two or more thereof.

Specific examples of the carboxyl-containing unsaturated monomer (b) include acrylic acid, methacrylic acid, maleic acid, itaconic acid, fumaric acid, β-carboxyethyl acrylate or the like. Of these monomers, especially preferred are acrylic acid and methacrylic acid. These monomers (b) may be used singly or in the form of a mixture of any two or more thereof.

The acrylic emulsion-type adhesive of the present invention may also contain, in addition to the above alkoxysilane group-containing unsaturated monomer and the components (a) and (b), the other unsaturated monomers, if required, unless the effects of the present invention are adversely affected by the addition thereof. Specific examples of the other unsaturated monomers include methyl (meth)acrylate, ethyl (meth)acrylate, n-butyl methacrylate, isobutyl methacrylate, 2-ethylhexyl methacrylate, cyclohexyl (meth)acrylate, styrene, α-methyl styrene, acrylonitrile, vinyl acetate, etc., as well as epoxy-containing unsaturated monomers such as glycidyl (meth)acrylate and methylglycidyl (meth)acrylate, carbonyl-containing monomers such as (meth)acrolein and diacetone acrylamide, methylol monomers such as N-methylol (meth)acrylamide, unsaturated monomers having two or more unsaturated double bonds such as divinylbenzene, sulfonic group-containing monomers such as sodium vinylsulfonate and sodium styrenesulfonate, or the like.

The chain transfer agent may be optionally added and serves as a component for imparting a pressure-sensitive adhesion force to the adhesive. Specific examples of the chain transfer agent include alcohols such as methanol, ethanol and isopropyl alcohol, mercaptans such as dodecyl mercaptan and lauryl mercaptan, or the like.

Various coating apparatuses may be used for applying the above acrylic emulsion-type adhesive, though not limited to particular ones. Specific examples of the coating apparatuses include known coaters such as a roll coater, a knife coater, a bar coater, a die coater, an air-knife coater, a gravure coater and a curtain coater.

The amount of the acrylic emulsion-type adhesive applied may be controlled to the range of 5 to 50 g/m² on the basis of its dried weight. When the amount of the acrylic emulsion-type adhesive applied lies within the above-specified range, a sufficient adhesion property of the resultant film can be obtained and, at the same time, disadvantages such as swell-out of the adhesive from the film can be effectively inhibited. From the above viewpoints, the amount of the acrylic emulsion-type adhesive applied is more preferably 10 to 30 g/m².

Meanwhile, as the coating method for applying the above adhesive, there may be used a transfer coating method in which the adhesive is applied onto the release material such as release paper and then transferred onto the transparent film, or a direct coating method in which the adhesive is directly applied onto the transparent film and then laminated on the release material. The overlaminating adhesive film of the present invention can be advantageously produced by any of the transfer coating method and the direct coating method since a wetting agent such as surfactants for enhancing a wettability of the adhesive to the release material is added to the adhesive in such an amount as not to adversely affect a water resistance thereof.

EXAMPLES

The present invention will be described in more detail by reference to the following examples, but it should noted that these examples are only illustrative and not intended to limit the scope of the present invention thereto.

The evaluation methods are explained below (Evaluation Methods)

1. Transparency

A release paper was peeled off from the respective overlaminating adhesive films obtained in Examples and Comparative Examples, and each of the adhesive films was then laminated over a 50 μm-thick PET film to prepare a test specimen having a size of 50 mm×50 mm. The haze of the test specimen was measured using a turbidity meter "NDH2000" available from Nippon Denshoku Kogyo Co., Ltd.

2. Water Whitening Resistance

The same test specimen as used in the above transparency test was immersed in warm water at 60° C. and allowed to stand therein for 3 days. Then, the test specimen was taken out of the warm water, and the haze thereof was measured using the same turbidity meter as used for the above transparency test.

3. Ink Bleeding Resistance

Images were printed on a color bubble-jet (BJ) printing lustered film "AG-1" as a genuine film available from Cannon Corp., using a printer "BJF-850" available from Cannon Corp. Then, the respective overlaminating adhesive films obtained in Examples and Comparative Examples were laminated over a printed surface of the lustered film. The thus obtained laminated film was allowed to stand at 40° C. under a relative humidity of 80% for 2 weeks, and then observed to evaluate an ink bleeding resistance thereof according to the following ratings.

A: Identical or less ink bleeding as compared to the case where no overlaminating adhesive film was used;

B: Much ink bleeding as compared to the case where no overlaminating adhesive film was used, but still acceptable for practical use;

C: Considerable ink bleeding as compared to the case where no overlaminating adhesive film was used, to such an extent that designs thereon were severely damaged.

4. Laminating Suitability (Damage of Transparency due to Bubbles)

A Chinese character was screen-printed on a 1 mm-square portion of a 50 μm-thick PET film. An overlaminating adhesive film having a size of 50 mm×50 mm was laminated over the printed surface of the PET film such that bubbles were trapped therebetween. The thus obtained laminated film was allowed to stand for 3 days, and then observed by an optical microscope at a magnification of 50 times to evaluate removal of the bubbles therefrom according to the following ratings.

A: A sufficient amount of the bubbles trapped immediately after the lamination were removed so that the film showed a good transparency;

B: A substantial amount of the bubbles trapped immediately after the lamination were removed so that the film showed a good transparency;

C: A some amount of the bubbles trapped immediately after the lamination remained, but the transparency of the film was still maintained as a result of visual observation; and D: An almost whole amount of the bubbles trapped immediately after the lamination were unremoved so that the transparency of the film was severely damaged.

5. Peel Trace (Orange Peel)

The respective overlaminating adhesive films obtained in Examples and Comparative Examples were rolled up by a length of 30 m around a paper tube having a diameter of 3 inch, and allowed to stand for 7 days while maintaining its rolled state. Thereafter, a core portion of the roll was cut into a test specimen, and the obtained test specimen was attached to a slide glass to measure an image clarity thereof by a light transmission method using an image clarity tester "ICM-IDP" available from Suga Testing Machine Mfg. Co., Ltd. (optical comb spacing: 0.5 mm). The larger value of the image clarity indicates a more excellent transparency of the film. The image clarity value approximately corresponds to the following evaluation ratings by visual observation.

90% or higher: Extremely excellent in transparency

85% or higher but less than 90%: Excellent in transparency

75% or higher but less than 85%: Slight orange peel due to adhesive

Less than 75%: Considerable orange peel due to adhesive with damaged transparency Example 1

(1) Production of Adhesive 40 parts by mass of ion-exchanged water and 0.2 part by mass of a radical-polymerizable surfactant "AQUARON KH-10" available from Dai-Ichi Kogyo Seiyaku Co., Ltd., were charged into a polymerization flask equipped with a stirrer, a thermometer, a reflux condenser and a dropping funnel, and heated to 80° C.

Next, a mixture composed of 80 parts by mass of 2-ethylhexyl acrylate, 16 parts by mass of methyl methacrylate, 2 parts by mass of acrylic acid and 2 parts by mass of methacrylic acid was mixed with a solution obtained by emulsifying and dispersing 0.2 part by mass of γ-methacryloxypropyltrimethoxysilane as an alkoxysilane group-containing unsaturated monomer ("Silicone KBM-503" available from Shin-Etsu Chemical Co., Ltd.), 0.03 part by mass of dodecylmercaptan as a chain transfer agent and 1.0 part by mass of a radical-polymerizable surfactant "AQUARON HS-10" available from Dai-Ichi Kogyo Seiyaku Co., Ltd., in 49 parts by mass of water, and a polymerization initiator obtained by dissolving 0.3 part by mass of potassium persulfate in 9.7 parts by mass of water. The resultant mixed solution was dropped through the dropping funnel into the polymerization flask for 3 hours, and the contents of the flask were emulsion-polymerized at 80° C.

Thereafter, the resultant aqueous dispersion was aged at 80° C. for 2 hours, cooled and then treated with aqueous ammonia for adjusting the pH thereof to 7.5 to thereby obtain an aqueous emulsion containing particles having an average particle size of 150 nm. Further, 2 parts by mass of a silicone-based defoamer "BYK025" available from BYK-Chemie GmbH and 0.3 part by mass of an urethane-based thickening agent "EXP300" available from Rohm and Haas Company were added to the thus obtained aqueous emulsion to obtain an acrylic emulsion-type adhesive.

(2) Production of Overlaminating Adhesive Film

A silicone release agent-coated polyethylene laminate-type release paper as a release material whose surface contacting with an adhesive layer subsequently formed thereon had a centerline average surface roughness of 0.2 μm, was coated with the acrylic emulsion-type adhesive obtained in the above step (1) by a knife coater to form the adhesive layer having a dried thickness of 20 μm. Then, a 25 μm-thick PET film was laminated over the adhesive layer to prepare an overlaminating adhesive film (transfer coating method).

The thus obtained overlaminating adhesive film was tested to evaluate the above properties thereof The results are shown in Table 1.

Example 2

The same procedure as in EXAMPLE 1 was repeated except that γ-methacryloxypropyltriethoxysilane as an alkoxysilane group-containing unsaturated monomer ("Silicone KBE-503" available from Shin-Etsu Chemical Co., Ltd.) was used instead γ-methacryloxypropyltrimethoxysilane, to obtain an overlaminating adhesive film. The results of evaluation of the thus obtained film are shown in Table 1.

Example 3

The same adhesive as prepared in the step (1) of EXAMPLE 1 was directly applied onto a 25 μm-thick PET film to form an adhesive layer having a dried thickness of 20 μm. Then, the same release paper as used in EXAMPLE 1 was laminated over the adhesive layer to obtain an overlaminating adhesive film (direct coating method). The results of evaluation of the thus obtained film are shown in Table 1.

Comparative Examples 1 to 4

The same procedure as in EXAMPLE 1 was repeated except that composition of the acrylic resin constituting the acrylic emulsion-type adhesive, average particle size and pH were changed as shown in Table 1, to obtain overlaminating adhesive films. The results of evaluation of the thus obtained films are shown in Table 1.

Comparative Example 5

The same procedure as in EXAMPLE 1 was repeated except that a glassine-type release paper whose surface contacting with the adhesive layer had a centerline average surface roughness of 0.7 μm, was used as the release material, to obtain an overlaminating adhesive film. The results of evaluation of the thus obtained film are shown in Table 1.

Comparative Example 6

The same procedure as in EXAMPLE 3 was repeated except that a glassine-type release paper whose surface contacting with the adhesive layer had a centerline average surface roughness of 0.7 μm, was used as the release material, to obtain an overlaminating adhesive film. The results of evaluation of the thus obtained film are shown in Table 1.

TABLE 1

| | | Ex. 1 | Ex. 2 | Ex. 3 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|
| Adhesive | 2EHA*[1] | 80 | 80 | 80 | 80 | 80 | 80 | 80 | 80 | 80 |
| | MMA*[2] | 16 | 16 | 16 | 16 | 16 | 16 | 16 | 16 | 16 |
| | MAA*[3] | 2 | 2 | 2 | 2 | 2 | 2 | 2 | 2 | 2 |
| | AA*[4] | 2 | 2 | 2 | — | 2 | 2 | 2 | 2 | 2 |
| | 2HEA*[5] | — | — | — | 2 | — | — | — | — | — |
| | Dodecylmercaptan | 0.03 | 0.03 | 0.03 | 0.03 | 0.03 | 0.03 | 0.03 | 0.03 | 0.03 |
| | Silicone KBM-503 | 0.2 | — | 0.2 | 0.2 | 0.2 | 0.2 | 0.2 | 0.2 | 0.2 |
| | Silicone KBE-503 | — | 0.2 | — | — | — | — | — | — | — |
| | pH | 7.5 | 7.5 | 7.5 | 7.5 | 7.5 | 9.0 | 6.8 | 7.5 | 7.5 |
| | Average particle size (nm) | 150 | 150 | 150 | 150 | 250 | 150 | 150 | 150 | 150 |
| Release paper | Centerline average surface roughness (μm) | 0.2 | 0.2 | 0.2 | 0.2 | 0.2 | 0.2 | 0.2 | 0.7 | 0.7 |
| Coating method | | T** | T** | D*** | T** | T** | T** | T** | T** | D*** |
| Transparency | Haze (%) | 2.06 | 2.43 | 1.73 | 2.32 | 2.78 | 2.20 | 2.80 | 2.30 | 2.14 |
| Water whitening resistance | Haze (%) | 3.65 | 4.30 | 2.63 | 3.88 | 11.0 | 3.45 | 10.8 | 4.86 | 4.30 |
| Ink bleeding resistance | | A | A | A | C | B | C | C | C | A |
| Laminating suitability | Transparency due to bubbles | A | A | A | C | C | B | B | C | B |
| Peel trace | Orange peel (%) | 88.5 | 87.2 | 92.8 | 77.5 | 78.2 | 86.8 | 88.0 | 65.5 | 67.5 |

Note:
*[1] 2-ethylhexyl acrylate
*[2] Methyl methacrylate
*[3] Methacrylic acid
*[4] Acrylic acid
*[5] 2-hydroxyethyl acrylate
T**: Transfer coating method
D***: Direct coating method As apparently understood from Table 1, the overlaminating adhesive films produced according to the present invention (EXAMPLES 1 TO 3) were not only excellent in all of transparency, water whitening resistance, ink bleeding resistance and laminating suitability, but also substantially free from peel traces. On the other hand, the film using the monomer component containing the hydroxy-containing unsaturated monomer (COMPARATIVE EXAMPLE 1) as well as the films using the adhesive whose pH was out of the specific range of the present invention (COMPARATIVE EXAMPLES 3 AND 4), were deteriorated in especially ink bleeding resistance. In addition, the film using the adhesive having an average particle size exceeding the specific range of the present invention (COMPARATIVE EXAMPLE 2) was deteriorated in especially water whitening resistance, and the films using the release paper whose surface had a centerline average surface roughness exceeding the specific range of the present invention (COMPARATIVE EXAMPLES 5 AND 6) were deteriorated in especially evaluation results of peel traces.

INDUSTRIAL APPLICABILITY

The overlaminating adhesive film of the present invention is excellent in not only orange peel resistance of its adhesive layer and water resistance, but also bubble-removing property after being laminated to an adherend. Further, an ink-jet printed surface over which the overlaminating adhesive film of the present invention is laminated, suffers from a less ink bleeding.

The invention claimed is:

1. A method of making an overlaminating adhesive film, the method comprising producing an adhesive layer comprising a silicon-containing acrylic emulsion-type adhesive by a process comprising emulsion-polymerizing a monomer component, which includes an alkoxysilane group-containing unsaturated monomer in which each alkoxy group has 1 to 4 carbon atoms, but which includes no hydroxy-containing unsaturated monomer, to form an aqueous dispersion;

adjusting the pH of the aqueous dispersion to a range of from 7.2 to 8.5 to obtain an aqueous emulsion comprising the silicon-containing acrylic emulsion-type adhesive, where the silicon-containing acrylic emulsion-type adhesive has an average particle size of 200 nm or smaller;

providing a transparent film and a release material;

applying a coating of the aqueous emulsion onto either the transparent film or the release material; and drying the coating; and laminating the transparent film, the adhesive layer and the release material to produce the overlaminating adhesive film.

2. The method according to claim 1, wherein the monomer component further includes an acrylic acid ester containing a $C_4$ to $C_{12}$ alkyl group and a carboxyl-containing unsaturated monomer.

3. The method according to claim 1, wherein the coating of the aqueous emulsion is applied on the transparent film, and then the release material is laminated over the coating.

4. The method according to claim 1, wherein the coating of the aqueous emulsion is applied on the release material, and then the transparent film is laminated over the coating.

5. The method according to claim 1, wherein the transparent film is selected from the group consisting of polyolefin films and polyester films.

6. The method according to claim 1, wherein the overlaminating adhesive film comprises 5 to 50 g/m$^2$ of the silicon-containing acrylic emulsion-type adhesive, based on the dried weight of the silicon-containing acrylic emulsion-type adhesive.

7. The method according to claim 1, wherein the monomer component comprises 0.001 to 5 mass % of the alkoxysilane group-containing unsaturated monomer.

8. The method according to claim 1, wherein the silicon-containing acrylic emulsion-type adhesive comprises a polymer having a carbon-carbon backbone and containing alkoxysilane functional groups.

9. The method according to claim 1, wherein the silicon-containing acrylic emulsion-type adhesive has an average particle size of from 150 to 200 nm.

10. The method according to claim 1, further comprising producing the release material by applying a silicone-based release agent onto a resin film laminated on a kraft paper, a glassine paper, a wood-free paper, a cast-coated paper or a clay-coated paper; or a water-soluble polymer coated on a kraft paper, a wood-free paper or a cast-coated paper.

11. The method according to claim 1, wherein the coating of the aqueous emulsion is applied directly to a surface of the release material; and the surface of the release material has a centerline average surface roughness of 0.5 μm or lower.

\* \* \* \* \*